United States Patent [19]

Podkopaev et al.

[11] 3,983,639
[45] Oct. 5, 1976

[54] TEACHING MACHINE

[76] Inventors: Boris Ivanovich Podkopaev, Belomorskaya ulitsa, 22, korpus 3, kv. 19; Ljudmila Dmitrievna Chervyakova, 4 Grazhdanskaya ulitsa, 34, korpus 1, kv. 71, both of Moscow, U.S.S.R.

[22] Filed: Mar. 20, 1975

[21] Appl. No.: 560,233

Related U.S. Application Data

[63] Continuation-in-part of Ser. Nos. 427,408, Dec. 21, 1973, abandoned, and Ser. No. 840,190, July 9, 1969, abandoned.

[52] U.S. Cl. ................................. 35/9 A; 35/35 R
[51] Int. Cl.² ........................................... G09B 7/06
[58] Field of Search ............. 35/8 R, 9 R, 9 A, 9 B, 35/48 R, 35 R

[56] References Cited
UNITED STATES PATENTS

| | | | |
|---|---|---|---|
| 3,308,559 | 3/1967 | Kirkconnell et al. | 35/9 A |
| 3,319,356 | 5/1967 | Berkeley | 35/9 B |
| 3,386,187 | 6/1968 | Kilby | 35/9 A |
| 3,405,457 | 10/1968 | Bitzer | 35/9 R |

Primary Examiner—William H. Grieb
Attorney, Agent, or Firm—Haseltine, Lake & Waters

[57] ABSTRACT

A teaching machine, particularly for teaching foreign languages, comprising a unit for introducing algorithmic problems, a control unit for the machine, a signalling unit, and a unit for selection of answers, provided with a replaceable program frame having electric plug contacts, adapted to be replaced when the code of a program is varied, the program frame carrying a choice of possible answers to the problems introduced into the machine, the answers being recorded on a code-bearing panel of the program frame. The teaching machine features a direct introduction of the answer and is adapted for practical experience and control testing of the assimilation of the language material with respect to the lexical and grammatical aspects thereof.

5 Claims, 6 Drawing Figures

TEACHING MACHINE

The present application is a continuation-in-part of our co-pending Applications Ser. No. 840,190 filed on July 9, 1969 and Ser. No. 427,408 filed on Dec. 21, 1973, both now abandoned.

BACKGROUND OF THE INVENTION

The present invention relates to teaching devices and, more particularly, it relates to teaching machines preferably intended for teaching foreign languages on the basis that, in view of the specific methods used for foreign language teaching, the device provides a novel method of introducing answers in the machine, using the means of the language being studied while avoiding undesirable stages such as intermediate digital coding of the correct answer or camouflage of the correct answer by a number of false ones, as presently known in various teaching devices and systems.

A teaching machine is known, which comprises a housing receiving thereinside a unit for introducing successive algorithmic problems, electrically connected to a control unit of the machine, to a signalling unit and to a unit for introducing answers (cf. U.S. Pat. No. 3,386,187; June 4, 1968).

When this prior-art machine is used for teaching foreign languages to students, the answers must be coded in digital form before being introduced into the machine (thus creating a new artificial and undesirable stage in the language teaching process) or it is necessary to use the selection method system known in the programmed teaching technique, in which one correct answer is camouflaged with a number of false answers, thus creating, according to psychologists, obvious barriers for active assimilation of foreign languages in view of the fact that, being strongly motivated, the students memorize both correct and wrong answers and are likely to use the wrong answers spontaneously in speech. In addition, the arrangement of teaching programs with a large number of camouflaging answers complicates the operation of the person who prepares a program for an automatic lesson, because the selection of a logically grounded camouflaging "ballast" of wrong answers in the teaching program requires no less time that the composition of the program itself, if not more.

It is an object of the present invention to construct a teaching machine, preferably for the automatic, highly efficient and, consequently, intensive language pre-speech practice in the learning of foreign languages, mass testing of the assimilation of the current language material, which overcomes the disadvantages of the existing teaching machine used for teaching foreign languages and in which the correct answer is introduced by the means of the language studied, while avoiding intermediate digital coding or camouflaging of the correct answer among a number of false or true answers.

To achieve this object, the machine uses the so-called system of linguistic algorithmic (determining) problems which are widely used in all foreign language textbooks and are further developed during the course of automatic teaching. These are traditional language exercises having a fixed basic pattern of logical operations and which lead students toward a single correct answer. The presence of a clear algorithm of operations in problems, leading the students necessarily to the correct answer, makes it possible to use them as the foundation for a logical scheme in a teaching device, and with the program carrier being simplified as much as possible. Such exercises are intended for the active practising of words and grammar, or for the identification of personal and verbal forms, including the extra range of theoretical and practical courses in any language, and including the identification of various syntactical structures. Linguistic algorithmic problems also serve to instill the habit of analysis of sentence structure, the ability to distinguish interchangeable lexical variants and to actively use in oral speech the linguistic material practised with the help of the present machine. An example of such an algorithmic exercise is as follows:

Insert the correct conjunction in the following sentences:

| 1. | | it gets dark, we switch the lights on. |
| 2. | She may have gone | they arrived. |
| 3. | He'll stay here | she is back, etc. |

In order to carry out these problems, the students must possess firm knowledge, because the exercise is intended for intensive linguistic drill or testing. If the students possess firm knowledge in the narrow field presented in an exercise, they go over all the possible answers for the given problems and give the correct answer on the basis of the definite results obtained by the semantic analysis of the exercise or sentence structures, using the language means and avoiding digital coding of the linguistic material, for which purpose they utilize the code panel serving as a specific task for an exercise which is always closely associated with the subject of a specific linguistic algorthmic problem. In studying foreign languages, this pure language drill is necessary in order to leave more time for oral practice in classroom or oral tests during examinations. It is therefore an object of the present invention to provide a device which is aimed at solving the abovesaid specific problems in the course of foreign language teaching.

With this and other objects in view, the present invention resides in a teaching machine, particularly, for teaching foreign languages, comprising a housing accommodating thereinside a unit for introducing algorithmic problems, electrically connected to a control unit of said machine, to a signalling unit and to a unit for introducing answers, in which machine, according to the present invention, said unit for introducing answers is provided with a replaceable program frame having electric plug contacts, said frame being adapted to be replaced, when the code of a program is varied; a code-bearing panel having recorded thereon the elements of a language to form answers to the algorithmic linguistic problems introduced into said machine, said elements being located in frame windows and each of said language elements being arranged opposite the respective contact-operating key of the answer introducing unit, whereas the programming switches of the machine control units are electrically connected to the sockets of the electric plug contacts.

It is expedient that the lid of the machine housing be provided with a limit switch to preclude a possibility of peeking ahead.

It is also advisable that the electric plug contacts of said replaceable program frame be different in length so as to provide electrical means for the operable choice of one of the coded programs of said control unit.

It is also recommendable to provide said replaceable program frame with spring clamps.

It is further advisable that the control unit of the machine be provided with means for automatically advancing a teaching program through an incremental step after each successive answer has been introduced into said machine, and said means be electrically connected to said electric plug countacts of said replaceable program frame.

Other objects and advantages of the present invention will become apparent from the following detailed description of an embodiment thereof with due reference to the accompanying drawings, wherein.

Figure 1:
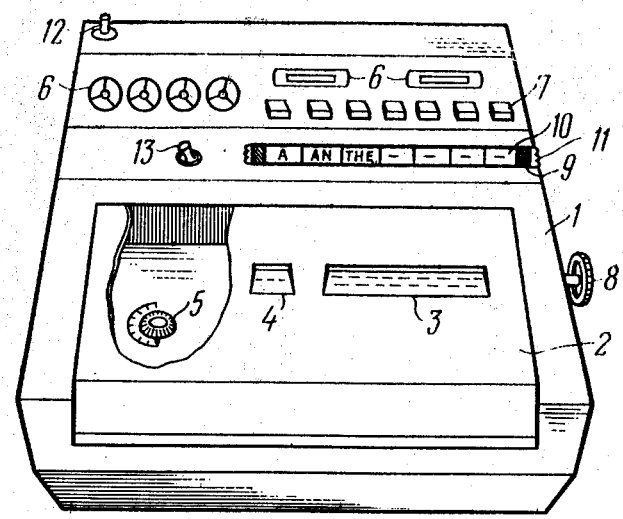
FIG. 1 is a general perspective view of a teaching machine, according to the invention.

Referring now to the drawings, a teaching machine illustrated in FIG. 1 comprises a housing 1 with a lid 2, the latter having openings or windows 3 and 4, respectively, for presenting a successive algorithmic linguistic problem and a correct answer to this problem (a prompting). Located inside the housing 1 are a control unit of the machine, a seven-position programming switch 5 which is viewed through a cutaway portion of the lid 2, a signalling unit with light indicators or pilot lamps 6 and an answer selection (introducing) unit with contact-operating keys 7. The machine is also provided with a knob 8 for manual advancing of a tape carrying a succession of algorithmic linguistic problems recorded thereon. The housing 1 mounts a replaceable program frame 9 with windows 10, a code panel 11 being placed under said program frame 9. In addition, the machine is provided with a printout mechanism mounted inside the housing 1; its control button 12 being brought out to the face panel of the housing 1, said panel mounting also a switch 13 to reset the teaching machine to the initial position.

Figure 2:
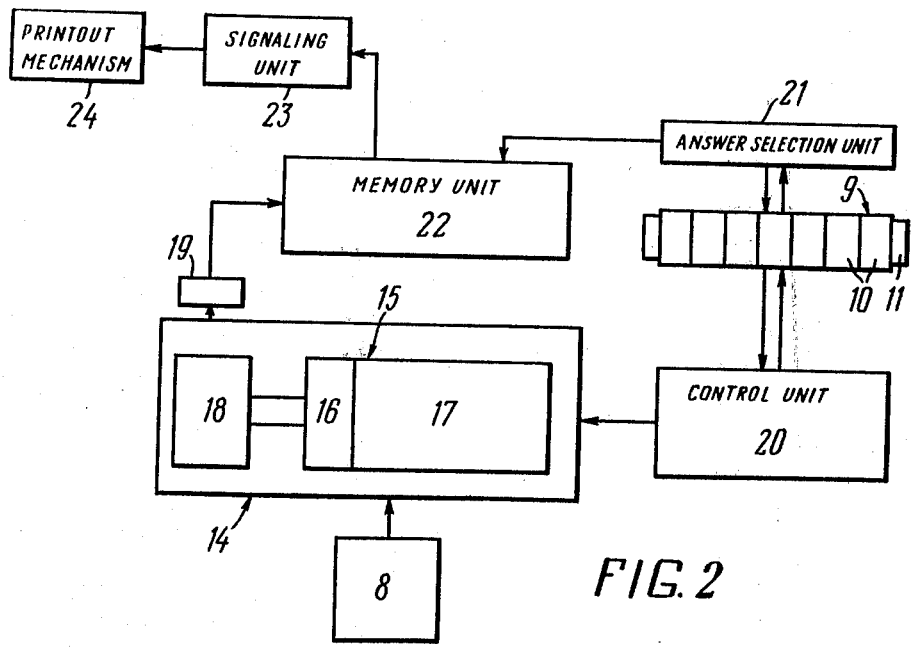
FIG. 2 is a block-diagram of a teaching machine, according to the invention.

The block diagram of the herein-disclosed teaching machine, illustrated in FIG. 2, includes the following component units.

A unit 14 for introducing successive algorithmic linguistic problems includes a tape feeding mechanism with rollers adapted to support a program record tape 15 having areas 16 and 17 on which are written or otherwise recorded, respectively, a teaching program (25 entries of algorithmic linguistic problems) and the correct answers (the promptings) to each individual one of the entries. An appropriate information reference is received in a container 18 located under the lid 2 (FIG. 1) which is provided with a limit switch 19 (FIG. 2).

A control unit 20 of the machine is electrically connected to the unit 14 for introducing algorithmic linguistic problems and to the sockets for the electric plug contacts of the replaceable program frame 9.

An answer selection unit 21 is electrically connected to the sockets for the electric plug contacts of the replaceable program frame 9 and is essentially an array of depressible contact-operating keys, each located opposite the respective one of the windows 10 of the replaceable program frame 9 and connected to the socket of the respective electric plug contact thereof. The answer selection unit 21 is electrically connected to a memory unit 22 adapted to count up incorrect answers, said memory unit being built around of, say, a stepping selector. The memory unit 22 is, in turn, electrically connected to a signalling unit 23 incorporating the light indicators or pilot lamps 6 (FIG. 1). A printout unit 24 is connected to the output of the signalling unit 23 (FIG. 2).

Figure 3:
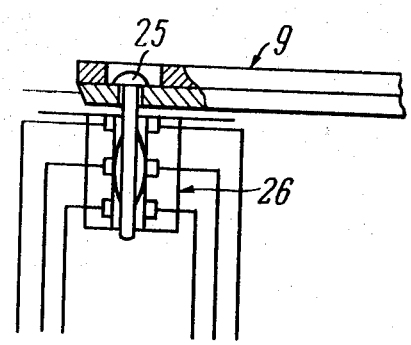
FIG. 3 is an electric plug contact of a replaceable program frame, according to the invention.

Illustrated in FIG. 3 is one of the plug contacts 25 of the replaceable program frame 9 and its corresponding socket 26. Provision of the plug contacts 25 (FIG. 3) unequal in length enables them to close the contacts of various groups of relays, thereby energizing the latter and making it possible to select various coded programs incorporating 25 code entries.

For the teaching program to be advanced through a single increment or step, the control unit 20 (FIG. 2) of the machine is provided with means electrically connected to sockets 26 for the plug contacts 25 of the replaceable program frame 9.

Figure 4:
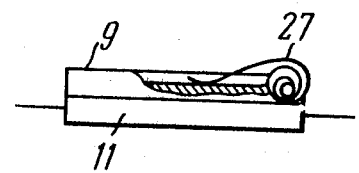
FIG. 4 shows spring clamps of a replaceable program frame, according to the invention.

FIG. 4 illustrates spring clamps 27 mounted adjacent to the end portions of the program frame and adapted to facilitate replacement of the code panels 11.

Figure 5:
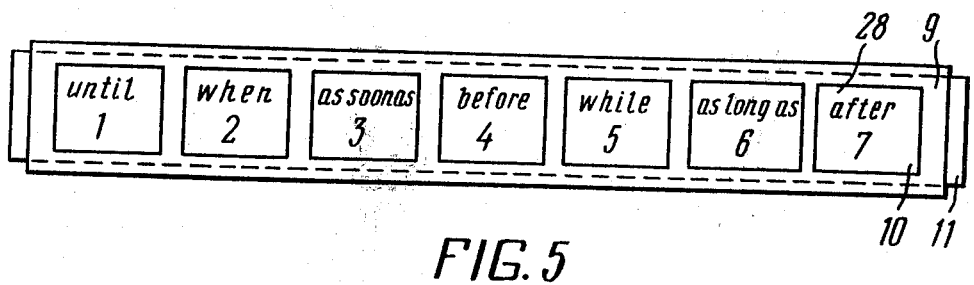
FIG. 5 is a program frame with a code panel, according to the invention.

FIG. 5 shows a front view of the replaceable program frame 9 with the code panel 11 laid thereunder, said panel carrying language elements 28 written thereon.

The code panel 11 may be made essentially as a paper strip on which are printed the language elements 28 that are necessary to form the correct answers.

By the language elements 28 are meant words or terms of any language, the formal parts of a word, grammatical forms and means of any language, conventional logic signs and symbols adapted in various domains of science, as well as graphic representations and drawings.

Figure 6:
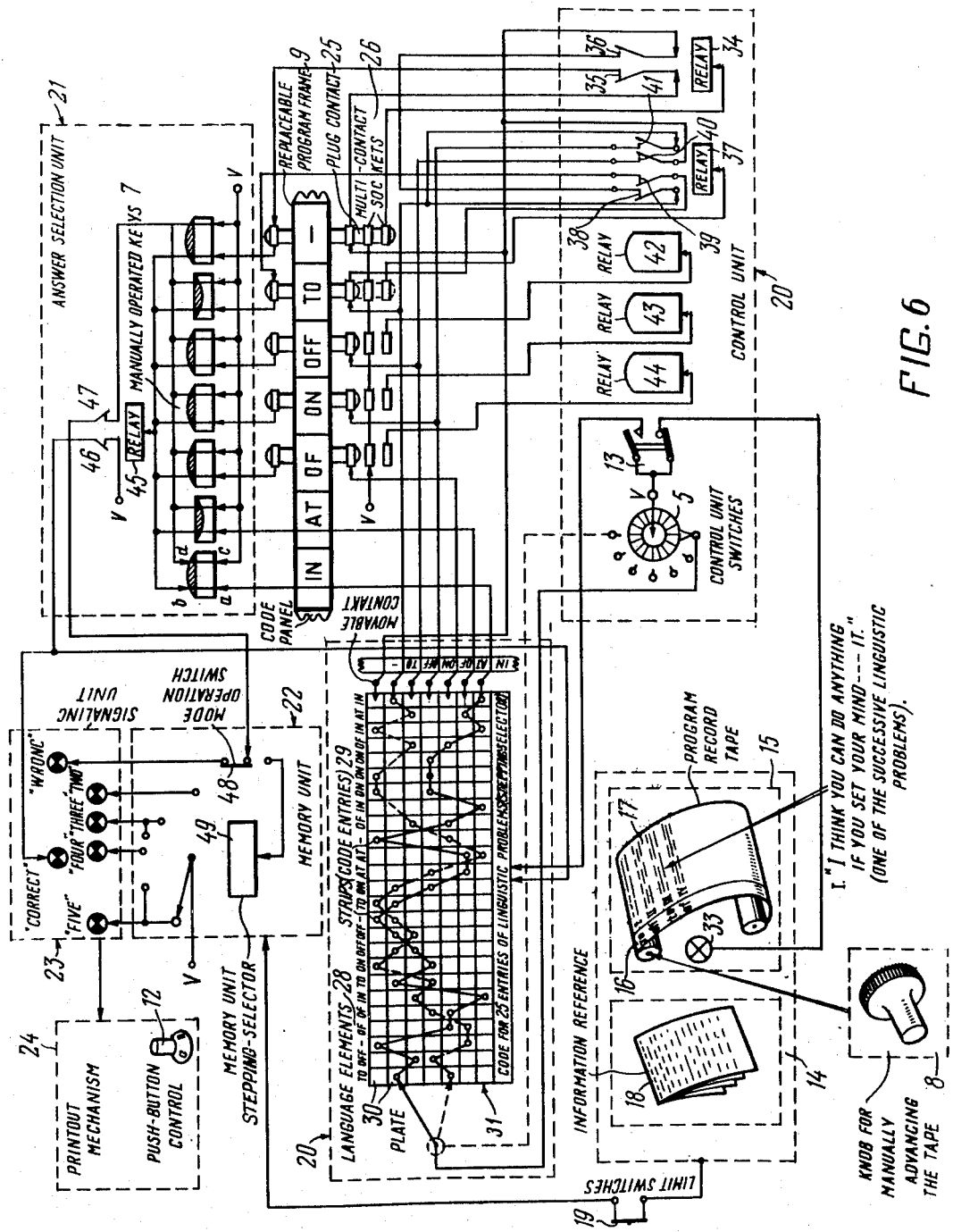
FIG. 6 is a schematic circuit diagram of a teaching machine, according to the invention.

FIG. 6 presents a detailed picture of the path along which the correct answer pulse (as well as an incorrect answer pulse) passes through all the machine units, and shows an electric interrelation of the plug contacts 25 different in length and the multicontact sockets 26 of the program frame 9, with the control unit 20, the memory unit 22 and the answer selection unit 21.

The control unit 20 has one seven-position programming switch 5 through the contacts of which voltage is fed to a first strip 29 of one of seven boards 30 of a stepping selector 31 of the control unit 20. Each of the boards 30 of the stepping selector 31 has twenty five strips 29 which are used to provide the coded program of the machine, comprising twenty five code positions. The coded program of the machine (code postions) is formed by a series connection (by soldering up) of the strips 29, as shown in FIG. 6. Voltage is delivered from the successive strip 29 of the selected coded program, of a movable contact 32 of the stepping selector 31 to the respective contacts of the sockets 26 of the program frame 9.

All the seven permanent coded programs of the machine are to be preestimated so as to avoid frequent repetition of the same code position (i.e., the strip 29)

on the same board 30 of the stepping selector 31 of the control unit 20. Thus, the strips 29 are used to form code position most reasonably as is shown by a solid line in FIG. 6.

A dotted line in that Figure illustrates an exemplary representation of the other code program resorted to for the sake of clarity. The other five programs are formed in a similar way.

Apart from the seven-position switch 5 the control unit 20 has one more two-position programming switch 13 to reset the stepping selector 31 into the initial position. One of the contacts of said switch 13 is connected to the winding of the stepping selector 31, while the other contact to an illumination lamp 33 located under a paper tape 17 on which are written the numbers (I, II, III, IV, and so on) of the learning program incorporating algorithmic exercises.

The control unit 20 has also six relays adapted to provide the selection of the correct answer within the range of combinations from "one out of two" to "one out of six" available answers. A relay 34 has one normally closed and one normally open contacts, 35 and 36 respectively. The contact 35 is adapted to pass the correct answer pulse from the contact of the seventh socket 26 to the seventh contact-operating key 7. The contact 36 of the relay 34 serves to pass the correct answer pulse from the seventh socket 26 to the sixth socket 26 when selecting one correct answer out of six possible ones. A relay 37 has two normally closed and two normally open contacts 38, 39 and 40, 41, respectively. The contact 38 of said relay serves to pass the correct answer pulse from the seventh socket 26 to the seventh contact-operating key 7. The contact 39 passes the correct answer pulse from the sixth socket 26 to the sixth contact-operating key 7. The contact 40 serves for passing the correct answer pulse from the seventh socket 26 to the first socket 26, and the contact 41 serves to pass the correct answer pulse from the sixth socket 26 to the fourth socket 26 when selecting the correct answer out of five possible ones. Relays 42, 43 and 44 of the control unit 20 with their contacts provide a possibility of switching over the correct answer selection circuits "one out of four," "one out of three" and "one out of two" answers available. Such patterns obey the same principle and logical aspects as those in the case of "one out of six" and "one out of five" possible answers, whose electric circuitry is exemplified by the switching pattern of the sockets 26 and the contacts of the relays 34 and 37 of the control unit 20.

Different-length electric plug contacts 25 are adapted to close the multicontact socket 26 in a variety of combinations. Thus, for instance, the shorter plug contacts 25 close the contacts of the sockets 26 that are electrically connected to the respective contact-operating keys 7 of the answer selection unit 21, thereby enabling, when the contact-operating key 7 is depressed, the correct answer pulse to pass to the memory unit 22 and further on to the signalling unit 23, as well as in the reverse direction to the control unit 20 and to the winding of the stepping selector 31 of the control unit 20 to switch the stepping selector 31 over to the next set of strips 29 so as to display the next code position of a coded program of the machine. The longer plug contacts 25 are to close the other contacts of the sockets 26 through which voltage is impressed upon the windings of those relays of the control unit 20 which have been interconnected through the longer plug contact 25 of the program frame 9. Thus, e.g., the seventh longer plug contact 25 (as shown in FIG. 6) energizes the winding of the relay 34, with the result that the contact 35 gets open and the seventh contact-operating key 7 of the answer selection unit 21 is disconnected. All the strips 29 of the seventh board 30 of the stepping selector 31 of the control unit 20 are switched over to the sixth board 30 of the same stepping selector, so as to provide selection of one out of six answers available. Such a connection is ensured by the sixth longer plug contact 25 and all the rest of longer plug contacts 25, viz., the fifth, fourth and third. The selection of a required combination of the longer and shorter plug contacts 25 is carried out by appropriately replacing the program frames 9.

The answer selection unit 21 has seven switching elements, viz., the contact-operating keys 7, each having four contacts $a, b, c, d$ (as exemplified by one of the keys 7). To the contact $a$ is delivered the correct answer pulse from the coded program of the stepping selector 31 of the control unit 20, the contact $b$ series-connected to the respective contacts of each of the seven contact-operating keys 7 of the answer selection unit 21, is also connected to the winding of the relay 45. When both said contacts $a$ and $b$ are closed, the relay 45 gets energized, and the contact 46 of said relay supplies voltage to the pilot lamp 6 (correct) and at the same time to the winding of the stepping selector 31 of the control unit 20. As a result, the student is given information that his answer is correct, and the machine displays a next successive problem of the teaching program, containing exercises. The contact $c$ of each of the contactoperating keys 7 of the answer selection unit 21 is electrically connected to the power supply source. The contact $d$ of the key 7 is connected via the contact 47 of the relay 45, to one of the contacts of the mode selector switch 48. In case of the "self-study" operating mode of the machine, the wrong answer pulse is delivered to the pilot lamp 6 (wrong) of the signalling unit 23. Under the same mode, the wrong answer pulse is passed through the second contact of the mode selector switch 48 to the winding of the stepping slector 49 of the memory unit 22 to energize one of the pilot lamps 6 of the signalling unit 23 that display an assessment mark of the student's work. Upon depressing the correct key 7 of the answer selection unit 21 and energizing the relay 45, its contact 47 is opened, and the wrong answer pilot lamp 6 does not light up.

In order to commence the performance of some teaching program consisting of algorithmic problems, the tutor or a person in charge of the machine operation should, using the seven-position programming switch 5 of the control unit 20, apply voltage to the coded program provided on stepping selector 31 of the control unit 20, according to which the text of the problem has been programmed. The mode selector switch 38 is in this case to be set to "self-study" or "examination." All teaching programs for the machine are compiled with due account for the internal codes of their programm (codes) of the machine.

FIG. 6 illustrates the coded program of the control unit 30 when selecting one out of six language elements 28 (English prepositions in, at, of, on, off, to).

After performing the analysis of the first (I) question of the teaching program of the linguistic algorithmic problems, the student infers that the use of the preposition "to" is the correct answer. The preposition "to" is recorded on the paper code panel 11 and is visible through the sixth window 10 of the replaceable program frame 9.

Located over the sixth window 10 is the sixth contact operating key 7 of the answer selection unit 21. If the answer is selected correctly and just the sixth key is depressed, located above the window 10 displaying the preposition "to", the contacts of the sixth key 7, when closed, will transmit the pulse from the first strip 29 of the sixth board 30 of the stepping selector 31 of the control unit 20 to the relay 35 and further on, through the contact 36 to the pilot lamp 6 (correct) and to the stepping selector 31 of the control unit 20, thus advancing the latter every time to a next (second, third, and so on, up to the 25th position). The cycle will be invariably reiterated according to the pattern presented in FIG. 6 in such a way that the code positions of the coded program of the machine will every time be changed, as well as the problems of the teaching program, since the latter is programmed with an account for the code positions of the coded program of the machine.

Should the student depress any "wrong" key 7, the pulse from the "wrong" key 7 passes directly through the contact 37 of the relay 35 to the pilot lamp 6 (wrong) in case of a "self-study" operation of the machine. When in the "examination" operating mode, the wrong answer pulse will all the time be summed up in the memory unit 22, and the pilot lamps 6 will light up displaying the assessment marks according to the five-mark grading system.

In the case where the preset program, incorporating linguistic algorithmic problems, occupies less than 25 positions, or if the work over the problem is not completed, the stepping selector 31 of the control unit 20 is returned to the initial position by using the reset switch 13 of the control unit 20.

When all the seven boards of the stepping selector 31 of the control unit 20 are used in a teaching program containing linguistic algorithmic problems, the replaceable program frame 9 makes use of the shorter plug contacts 25, and the correct answer pulses will pass through the normally closed contacts of the relays 34, 37, 42, 43 and 44 of the control unit 20. Thus, the "one out of seven" selection will take place.

To effect the selection "one out of six" language elements 28 (as shown in FIG. 6), the program 9 makes use of one longer plug contact 25 which is intended for connection through the third contact of the multicontact socket 26 of the relay 34. The result is that the contact 36 of the relay 34 switches over the seventh board 30 of the stepping selector 31 of the control unit 20 to the sixth board 30, and the contact 35 of the relay 34 disconnects the seventh contact-operating key 7 of the answer selection unit 21, so that the code positions from the switches of the seventh board 30 will be delivered to the sixth contact-operating key 7 (FIG. 6).

The principle of switching-over the machine electric circuitry in case of "one out of five" selection of the language elements 28 is illustrated in detail in a connection pattern of the contacts 38, 39, 40, 41 of the relay 37 which can be energized through the other longer plug contact of the program frame 9 (said plug contact 25 being shown with a dotted line in FIG. 6). In this case the contact 41 changes over the seventh board 30 of the stepping selector 31 of the control unit 20 to the fifth board 30, while the contact 40 switches over the sixth board 30 to the fourth one, the contact 39 disconnects the seventh contact-operating key 7 of the answer selection unit 21, and the countact 38 disconnects the sixth key of the same unit. The code positions from the switched-over seventh and sixth boards 30 will in this case be delivered to the fifth and fourth contact-operating keys 7 (as shown in FIG. 6).

The "one out of four", "one out of three" and "one out of two" selection of the language elements will be carried out according to the afore-described connection pattern (not shown in FIG. 6) with the help of longer plug contacts 25, the relay 42 (having three normally closed and three normally open contacts), the relay 43 (having four normally closed and four normally open contacts), and the relay 44 (having five normally closed and five normally open contacts). Changeover of the code positions from the disconnected contact-operating keys 7 of the answer selection unit 21 to the rest of the keys 7 is effected on the base of a reasonable combination of the delivery of the correct answer pulse to the same language element 28. Thus, for example, it would be illogical to repeat the correct answer to the same language element 28 several times even if "one out of two" selection takes place. An adequately reasonable and logical combination of such changeovers is accomplished with the help of normally closed and normally open contacts of the relays 42, 43 and 44 of the control unit 20, as is the case with the relays 34 and 37 and their normally closed and normally open contacts 35, 36, 38, 39, 40 and 41.

The program frames 9 to form new coded programs used in various combinations of a choice of the correct language element 28 are provided with an appropriately varying set of the longer plug contacts 25. Thus, the frame 9 for the "one out of two" selection has five longer plug contacts 25; the frame for the "one out of three" choice has four longer plug contacts 25, and so on. In case of the "one out of seven" selection the frame 9 has no longer plug contacts 25 whatever and, consequently, the relays 34, 37, 42, 43 and 44 remain deenergized, so that pulses from the code positions are free to pass from all the seven boards 30 of the stepping selector 31 via the seven multicontact sockets 26 to the respective contact-operating keys 7 of the answer selection unit 21 (as is shown in FIG. 6).

As arrangement of the coded program for the "one out of seven" selection is indicated with a dotted line in FIG. 6. In this case the code panel 11 may be such as shown in FIG. 5. Switching-over of the remaining five boards 30 (FIG. 6) each comprising 25 code positions (i.e., the strips 29) is carried out according to the same principle as shown in two examples of FIG. 6. All the seven boards 30 of the stepping selector 31 of the control unit 20 are out into the machine electric circuitry by the programming switch 5 of the control unit 20 (as shown in FIG. 6).

By changing the arrangement of the language elements 28 on the code panel 11, the program complier has the ability to boundlessly combine when writing the teaching programs, containing linguistic algorithmic problems in any language, with respect to all aspects of language and any level of study.

The herein-disclosed teaching machine is adapted for either one of two modes of operation, viz., a "self-study" operation and an "examination".

The basic program-introduced information for the herein-disclosed teaching machine is made by algorithmic linguistic testing problems, such as: select the appropriate one from the group of words and fill in the blank in the sentence; use the word given in brackets in the appropriate grammatic form; use the correct article, case, pronoun, conjunction, adverb, etc.; answer, which part of speech is this or that word in the sentence, and so on.

In order to commence the operation of the hereindisclosed teaching machine in a "self-study" mode, using one of the coded programs, the machine should be connected to the mains supply; the program tape 15 (FIGS. 2 and 6) should be threaded over the rollers of the tape feeding mechanism of the unit 14 for displaying algorithmic linguistic problems; the switch 13 (FIG. 1) should be operated to put the machine into the initial position for operation, whereby the illumination lamp for the program tape 15 is energized. Then the student should read the problem visible through the window 3 (FIG. 1) in the lid 2 of the housing 1, consider the problem, select the appropriate one from the language elements 28 given in the frames 10 of the replaceable program frame 9 and depress that one of the keys 7 which is located above said language element. If the answer is the correct one, one of the pilot lamps 6 lights up to flash the word "correct"; if the answer is wrong, another one of the pilot lamps 6 lights up to display the word "Wrong." For the successive problem to appear in the window 3, the student has to rotate the knob 8 through one angular step. In case the student is unable to find the correct answer in the course of a "self-study" operation, he/she may operate the machine for the prompting to appear in the window 4, or else may consult the information reference container 18, or a tutor.

The operation according to the "examination" mode is similar to the "self-study" operation, the difference laying in the memory unit 22 (FIG. 1) being now actuated to register and sum up the amount of the incorrect answers, whereby the signalling unit 23 sends an electric signal to that one of the pilot lamps 6 which displays the corresponding mark. Thus, for instance, when the "examination" program includes 25 algorithmic problems, one wrong answer out of the 25 will lead to the pilot lamp 6 displaying the "excellent" mark lighting up; with two wrong answers the "good" mark is displayed by the corresponding one of the pilot lamps 6; with four wrong answers it is the "satisfactory" mark which is displayed; and when the amount of the wrong answers exceeds four, the machine flashes the "unsatisfactory" mark. The printout mechanism 24 (FIG. 2) may be operated to print the respective mark in the examination card of the student.

Should the "unsatisfactory" mark be reached at the very beginning of the examination routine, (i.e., prior to the full set of problems being answered), the machine is either switched over to the "self-study" mode of operation, or else the rest of the codes of the problems still unanswered are reset.

The free use of the prompting and reference information in the course of the "examination" operation is prevented due to the provision of the limit switch 16. Should the lid 2 (FIG. 1) be opened in the course of examination to enable the student to peek ahead in the container 18 (FIG. 2) with the reference material, the limit switch 19 provided on the lid 2 (FIG. 1) operates to send a corresponding signal to the signalling unit 22 (FIG. 2), with the result that the pilot lamp 6 (FIG. 1) lights up to display the "unsatisfactory" mark.

The herein-disclosed teaching machne offers the advantage of introducing the answers directly by means of the language being studied, without any intermediate digital encoding, whereby the overall efficiency of the process of programmed study is stpped up. The machine proposed herein provides for alternating programs having a correct language element therein, with a flexible choice of answers: one out of two, out of three, out of four, out of five, out of six or out of seven. The system of interchangeable code panels carrying the appropriate linguistic information to choose from provides for natural grouping of the optimum combinations of answers within the subject of each testing or examination exercise and, consequently, makes it possible to completely dispense with the so-called "multiple choice method of answer introduction."

Although the present invention has been described in connection with a preferred embodiment thereof, it is to be understood that various changes, substitutions and alterations can be made therein without departing from the spirit and scope of the invention, as those component in the art will readily comprehend.

Such changes, substitutions and alterations should be considered as falling within the subject matter and scope of the invention, as defined in the claims to follow.

What is claimed is:

1. A teaching machine, particularly, for teaching foreign languages, comprising: a housing; an algorithmic-problem introducing unit located in said housing; a machine control unit located in said housing and operatively connected to said algorithmic-problem introducing unit; a set of coded programs corresponding to the introduced algorithmic problems and incorporated into said machine control unit; programming switches of said machine control unit electrically connected to said set of coded programs; an answer selection unit disposed in said housing and electrically connected to said algorithmic-problem introducing unit; a signalling unit located in said housing and electrically connected to said answer selection unit and to said algorithmic-problem introducing unit; a plurality of switching elements of said answer selection unit; a replaceable program frame of said answer selection unit adapted to be replaced when the code of a program is varied; a plurality of electric plug contacts of said replaceable program frame, said electric plug contacts differing in length so as to provide electrical means for the operable choice of one of the coded programs of said control unit; a plurality of sockets for said electric plug contacts, said sockets being electrically connected to said programming switches of said machine control unit, the signal output from said sockets being operatively connected to said answer selection unit; a plurality of discrete areas in said replaceable program frame; a code panel adapted to be laid under said replaceable program frame; a plurality of language elements recorded on said code panel and adapted to form the answers to algorithmic problems; said language elements located in said discrete areas of said replaceable program frame opposite said respective switching elements.

2. A teaching machine as claimed in claim 1, wherein said housing is provided with a lid having limit switches which are electrically connected to said signalling unit so as to prevent a possibility of peeking ahead.

3. A teaching machine as defined in claim 1 wherein said swtiching elements comprise contact-operating keys, said language elements being written on said code panel.

4. A teaching machine as claimed in claim 1, wherein said replaceable program frame is provided with spring clamps.

5. A teaching machine as claimed in claim 1, wherein said machine control unit has means for automatically advancing a teaching program through successive incremental steps, said means being electrically connected to said plug contacts of said replaceable program frame.

* * * * *